United States Patent
Engelhardt et al.

(10) Patent No.: US 7,434,470 B2
(45) Date of Patent: Oct. 14, 2008

(54) COMBINED PRESSURE AND TEMPERATURE SENSOR

(75) Inventors: Joerg Engelhardt, Ditzingen (DE); Oliver Stoll, Reutlingen (DE); Christian Roesser, Grossbottwar (DE); Markus Ledermann, Asperg (DE); Stefan Warth, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 11/642,365

(22) Filed: Dec. 19, 2006

(65) Prior Publication Data

US 2007/0186659 A1  Aug. 16, 2007

(30) Foreign Application Priority Data

Dec. 19, 2005  (DE) ........................ 10 2005 060 651

(51) Int. Cl.
*G01L 19/04* (2006.01)
(52) U.S. Cl. ........................................................ 73/708
(58) Field of Classification Search ........... 73/700–756; 361/283.1–283.4
See application file for complete search history.

(56) References Cited

U.S. PATENT DOCUMENTS

| | | | |
|---|---|---|---|
| 4,711,129 A | * | 12/1987 | Stubenberg et al. ........... 73/708 |
| 4,735,086 A | * | 4/1988 | Follmer .................... 73/204.19 |
| 5,461,922 A | * | 10/1995 | Koen ............................. 73/756 |
| 5,499,535 A | * | 3/1996 | Amano et al. ................. 73/717 |
| 5,948,989 A | * | 9/1999 | Ichikawa et al. .............. 73/708 |
| 6,003,379 A | * | 12/1999 | Ichikawa et al. .............. 73/708 |
| 6,813,952 B2 | * | 11/2004 | Yamashita et al. ............ 73/708 |

FOREIGN PATENT DOCUMENTS

| | | |
|---|---|---|
| DE | 197 45 244 | 4/1998 |
| DE | 101 09 095 | 9/2002 |
| EP | 0 863 676 | 9/1998 |
| EP | 1 521 061 | 4/2005 |
| WO | WO2007/062968 A1 | 6/2007 |

* cited by examiner

*Primary Examiner*—Andre J. Allen
*Assistant Examiner*—Jermaine Jenkins
(74) *Attorney, Agent, or Firm*—Kenyon & Kenyon LLP

(57) ABSTRACT

A combined pressure and temperature sensor for recording the pressure and the temperature of a medium. A sensor element of the combined pressure and temperature sensor includes a through-hole to a diaphragm and a bore for accommodating a temperature sensor. The diaphragm cooperates with a pressure sensor. At an end face of the sensor element, on the side of the medium, a cover is fastened, in which a hollow space is developed to accommodate the temperature sensor.

8 Claims, 3 Drawing Sheets

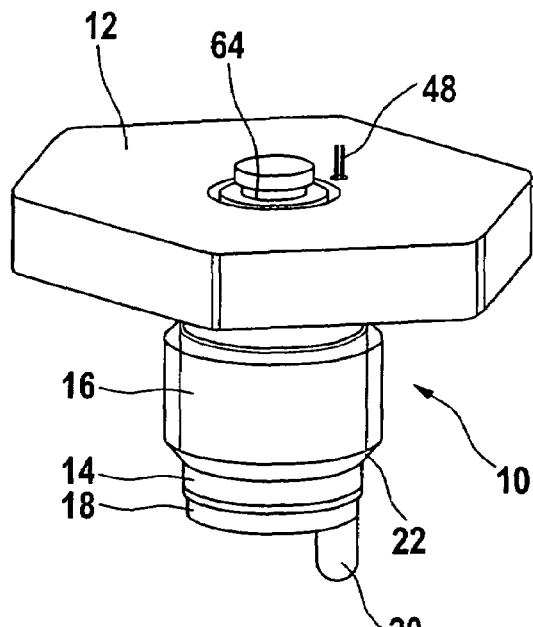
FIG. 1
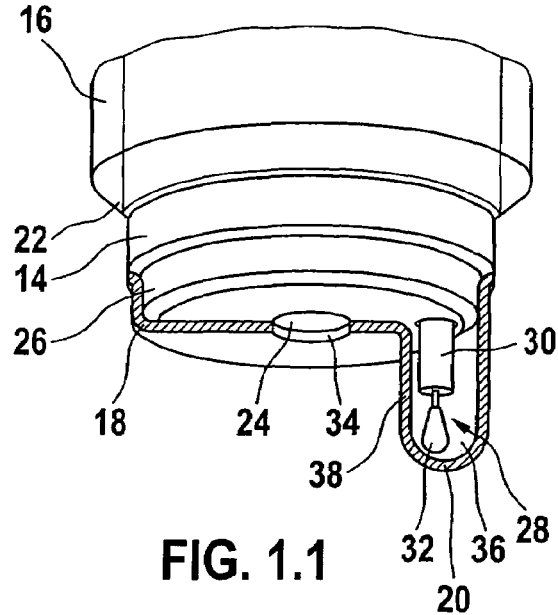
FIG. 1.1
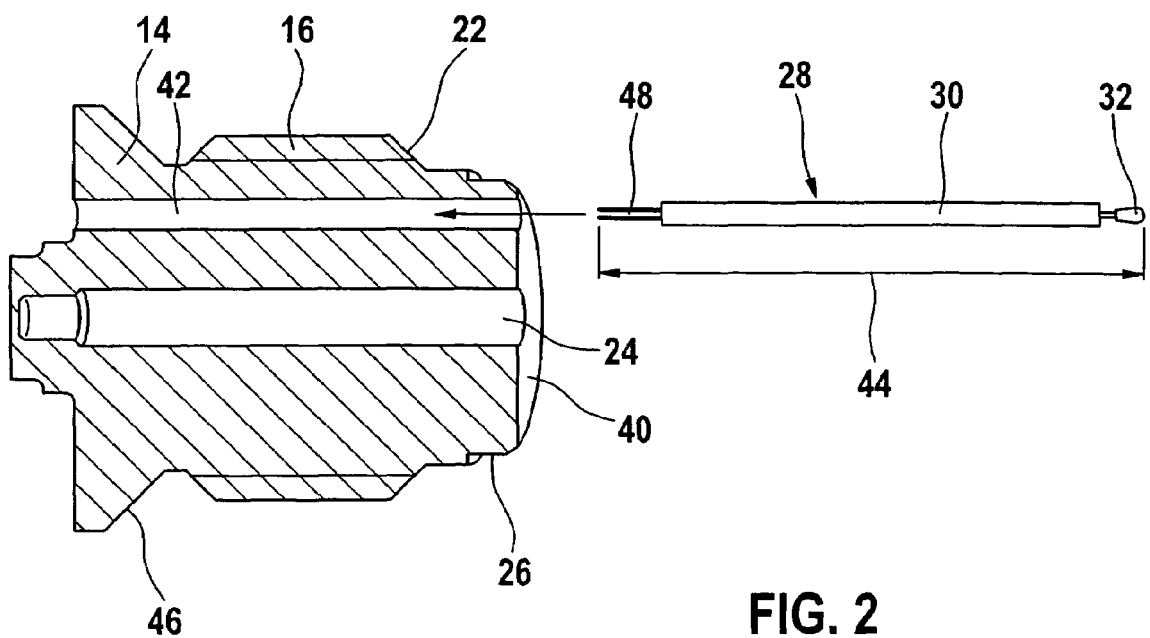
FIG. 2

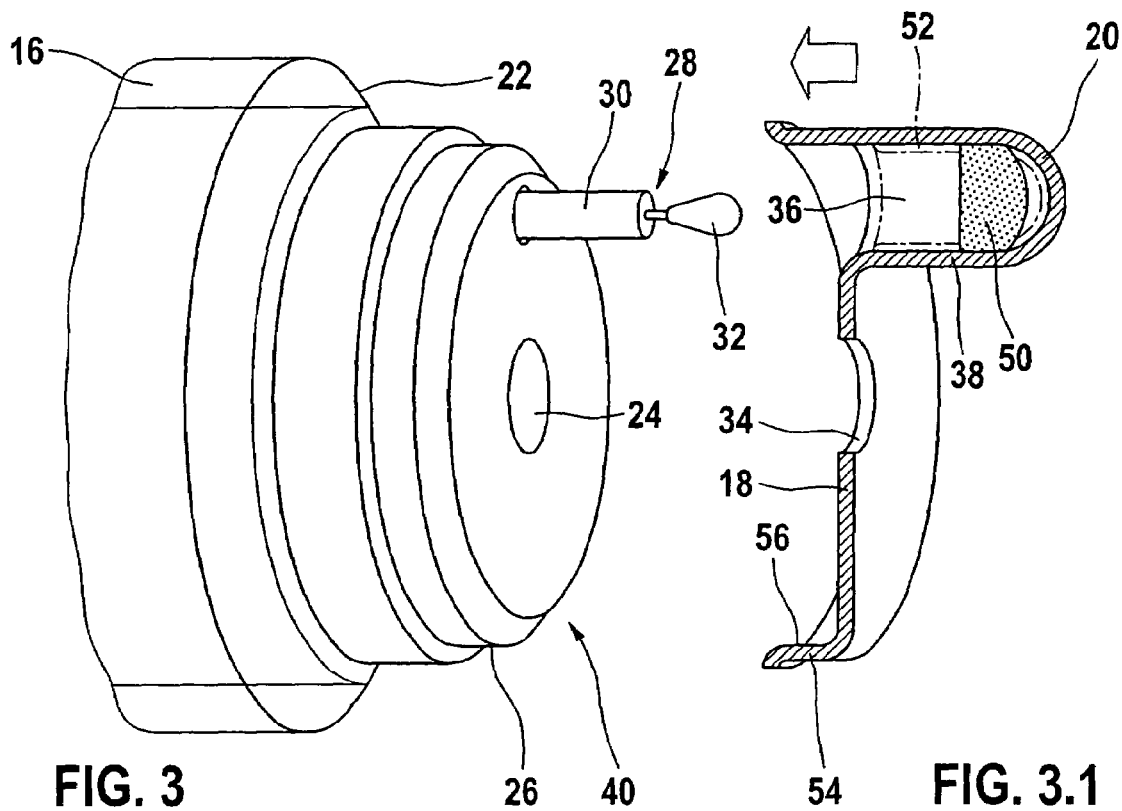
FIG. 3        FIG. 3.1
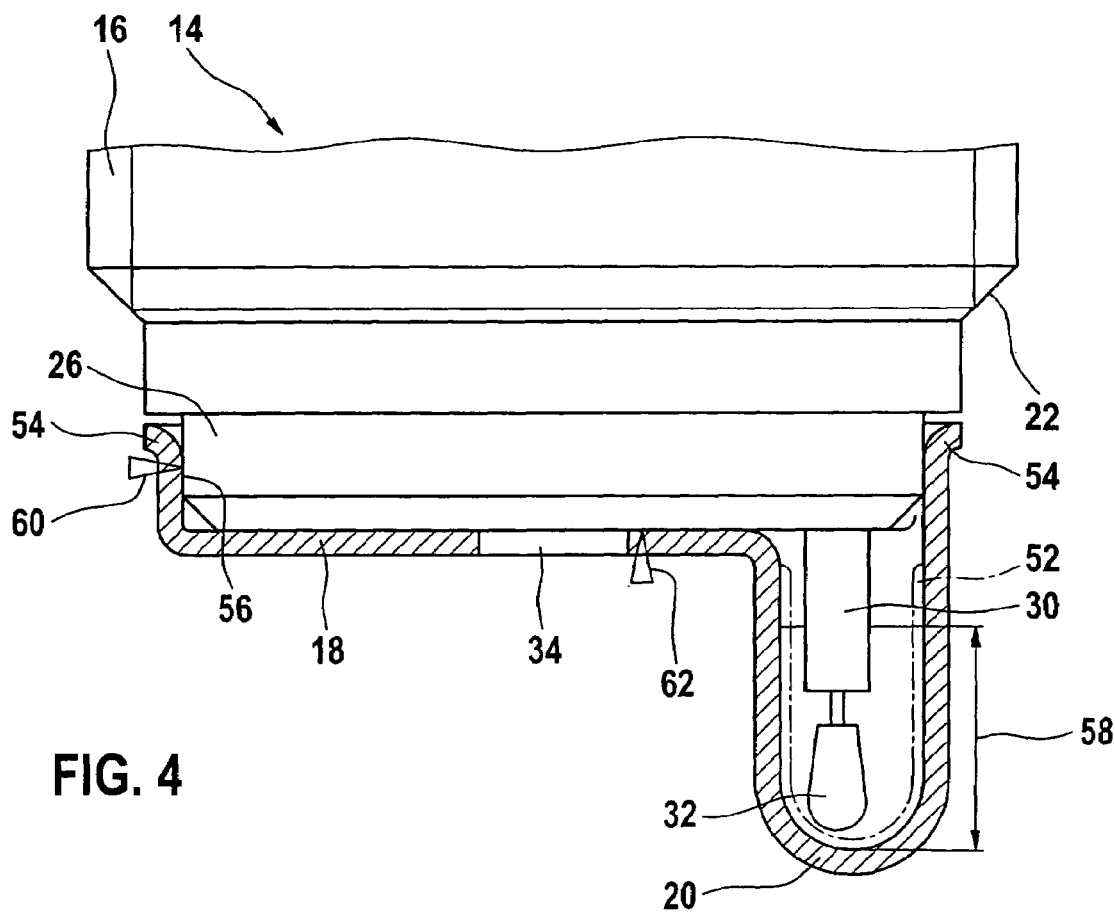
FIG. 4

COMBINED PRESSURE AND TEMPERATURE SENSOR

BACKGROUND INFORMATION

For future air conditioning systems installed in motor vehicles, it is to be expected that the usual R134a air conditioners will be replaced by $CO_2$ air conditioners, since, according to EU legislation, the cooling agent R134a, used up until now, will be totally prohibited as of the year 2016.

By contrast to the conventional air conditioner that is operated using cooling agent R134a, in the $CO_2$ air conditioner, both a pressure signal and a temperature signal from the compressor of the air conditioner will be required for the regulation of the air conditioner. The use of two sensors represents a considerable expenditure, since at least two plug connectors and several strands of cable have to be held in reserve, as well as sealing locations that have to be sealed at the interface locations and connecting locations of the individual components among one another. An attempt is made, therefore, to obtain both the pressure signal and the temperature signal by a combination of a pressure sensor and a temperature sensor.

Combined pressure and temperature sensors are known, for instance, from European Published Patent Application No. 1 521 061, German Published Patent Application No. 101 09 095, as well as German Published Patent Application No. 197 45 244, and European Published Patent Application No. 0 863 676. In the design approach according to German Published Patent Application No. 101 09 095, a front diaphragm sensor is used having a mounted plunge sensor. However, this design approach suffers from the disadvantage that the front diaphragm sensor is very sensitive in the vicinity of the diaphragm, and a protective screen should be preconnected. In the case of this design approach, it is used in racing car applications whose service life is extremely short. The design approach according to German Published Patent Application No. 197 45 244 describes a separate threaded part for the temperature sensor, which is sealed using a simple O-ring. However, the O-ring becomes brittle during a longer operating period, so that leakage sets in.

A further design approach possibility known from the related art relates to using the input resistance of a pressure-measuring bridge that is applied to a diaphragm so as to obtain a temperature signal. Based on the circumstance that the diaphragm is located relatively far from the measured medium, the temperature signal received is too inaccurate. However, in order to measure as far as possible in the measured medium, a complex construction technology and connecting technology are used. If the sensor extends into the measuring channel, it narrows down the channel, because of its cross section, to such an extent that considerable pressure reduction can occur, which impairs the measurement of the pressure signal.

The design approaches sketched above, known from the related art, do not represent satisfactory solutions for the reasons mentioned.

SUMMARY OF THE INVENTION

The design approach provided according to the present invention is based on the object of making available a concept that is as simple as possible, and is especially suitable for mass production, for a combined pressure and temperature sensor, which may be produced in a cost-effective manner.

Following the design approach provided according to the present invention, a combined pressure and temperature sensor is provided which, at its end exposed to the medium to be measured, has a cover in the form of a front plate that has a finger-shaped projection in which a temperature sensor is accommodated. Based on the circumstance that the cover applied at the end face of the sensor element has a finger-shaped projection, the temperature sensor enclosed by this projection is introduced as far as possible into the medium whose temperature is to be measured, so that the actual temperature of the medium is able to be reliably measured. The cover is preferably designed as a front plate which is manufactured by a deep-drawing method, and thus the front plate is able to be produced together with a mounting collar developed on it and the finger-shaped projection in one process.

The pressure tightness of the combined pressure and temperature sensor provided according to the present invention is assured in that, at the sensor element, below a tool connection that may, for instance be developed as a hex head, a conical sealing seat is developed. Because of the conical sealing seat, a relatively large-surface pressure seal is able to be implemented, which, as seen over the service life of the combined pressure and temperature sensor, is considerably more reliable than using an O-ring, as according to the design approach of German Published Patent Application No. 197 45 244.

At the cover for the end face of the sensor element, of the combined pressure and temperature sensor that is to face the medium, preferably a peripheral collar is formed which facilitates the mounting and centering of the cover, that is designed as a front plate, at the end face of the sensor element. In addition, the collar makes possible the thermal assembly between the cover and the sensor element of the combined pressure and temperature sensor. The cover, designed as a front plate, in which the finger-shaped projection is developed that encloses the temperature sensor, is preferably thermally fitted to a contact surface of the sensor element, for instance, laser welded, and in addition, it is assembled, by a further thermal connection, in the area of an opening which is aligned with a through-hole in the sensor element, also fitted thermally. The cover, which is developed at the end face of the sensor element, unblocks the through-hole mentioned because of the opening that is aligned with the through-hole for accommodating the pressure signal. Via this, the pressure of the medium acts on a diaphragm, that borders the through-hole, which is situated downstream of the pressure sensor.

The temperature sensor used in the combined pressure and temperature sensor is accommodated in the finger-shaped projection in a heat-conducting sealing compound, to improve the temperature coupling. Besides improving the temperature coupling, this material has the task of fixing the lead of the temperature sensor during assembly. The temperature sensor is designed as an elongated component with a small diameter, at whose one end contacts are developed for contacting the temperature sensor, and at whose other end there is the sensor head, which is enclosed by sealing compound within the finger-shaped projection of the cover. The sealing compound may be, for example, a silicone adhesive that has exceptional heat conductive properties. Instead of the silicone adhesive, a heat conducting paste or a silver conductive adhesive may also be used.

The temperature sensor is preferably provided with a plastic extrusion coating, which is used for insulation during adjustment as well as for the improvement of the guidance of the temperature sensor during its insertion into a temperature sensor bore developed in the sensor element.

Because of the design approach provided according to the present invention, the signal of the temperature sensor, which passes through the sensor element of the combined pressure and temperature sensor, can be conveyed right up to the plug contact. Alternatively, the signal of the temperature sensor obtained is able to be evaluated and adjusted in an evaluation circuit.

According to this alternative, a digital evaluation circuit is used for this purpose, having a digital interface. This offers the possibility of omitting one plug pin and increasing the accuracy of the temperature measurement.

The design approach provided according to the present invention stands out over the design approaches of the related art in that an extremely simple construction comes about, as well as making cost-effective manufacturing possible, since only a few components are used. In particular, it is very easy to manufacture the combined pressure and temperature sensor provided according to the present invention in mass production. The provided temperature sensor, that is used in the combined pressure and temperature sensor according to the present invention, operates independently of the pressure measurement, and is distinguished by a rapid response time.

BRIEF DESCRIPTION OF THE DRAWINGS

FIG. 1 shows the construction of the combined pressure and temperature sensor part.

FIG. 1.1 shows a perspective view of the lower side of the sensor element having the cover executed as a front plate shown in section, and having a finger-shaped projection for the temperature sensor.

FIG. 2 shows a section through the sensor element according to FIG. 1, having an illustration of the bores for measuring the pressure and for accommodating the temperature sensor.

FIG. 3 shows the end face of the sensor element with a through-hole and inserted temperature sensor.

FIG. 3.1 shows a section through the cover executed as front plate and having a sealing compound in its finger-shaped projection.

FIG. 4 shows the position of the thermal joining places between the cover and a contact surface on the lower end face of the sensor element.

DETAILED DESCRIPTION

Figure 5:
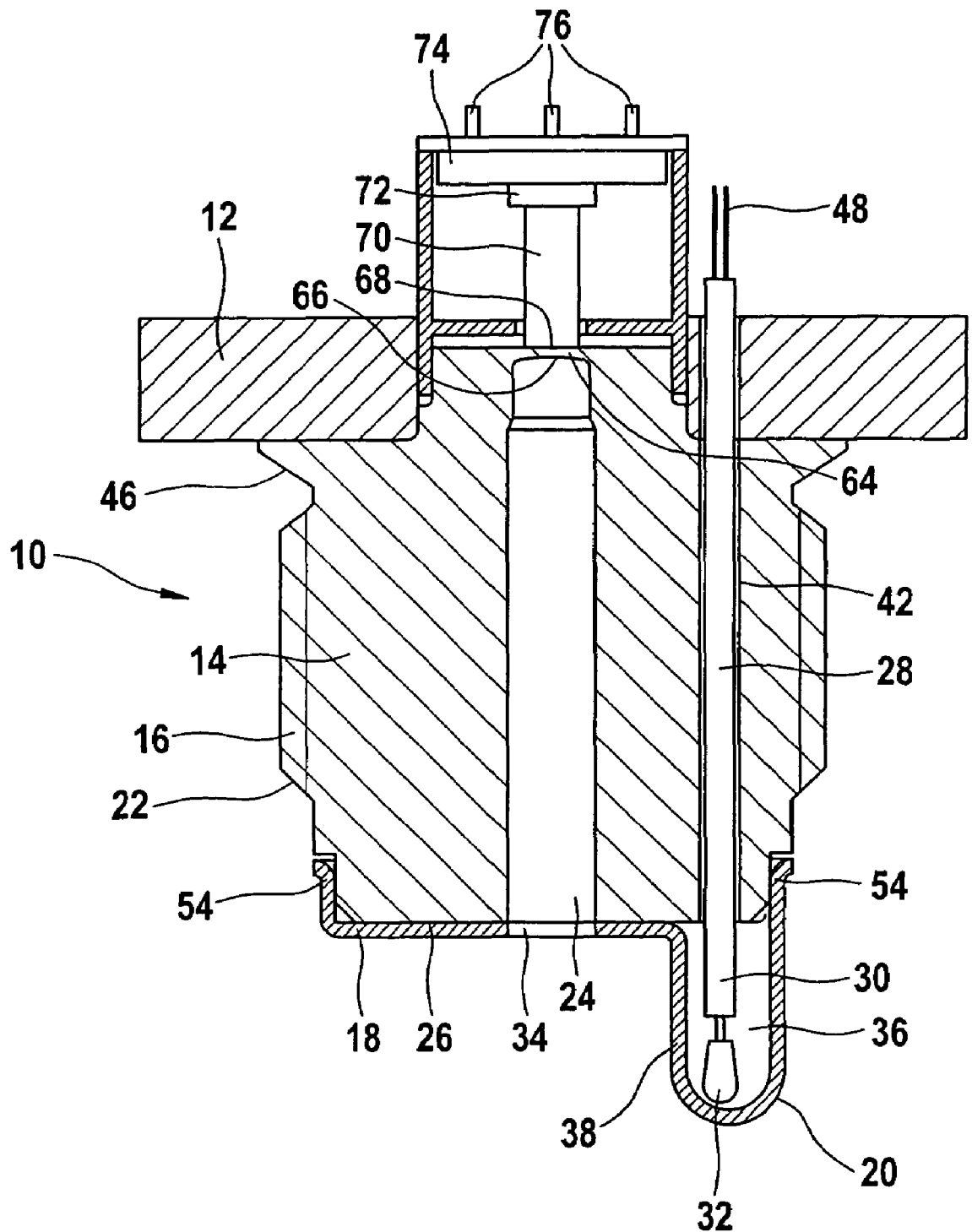
FIG. 5 shows a section through the ready mounted and joined combined pressure and temperature sensor.

In the representation according to FIG. 1, a perspective view will be seen of the combined pressure and temperature sensor proposed according to the present invention.

A combined pressure and temperature sensor 10 includes a tool connection 12, which is developed in the illustration according to FIG. 1 as a hexagonal connection. A sensor element 14 extends below tool connection 12, and it has a threaded section. Threaded section 16 runs out in a screw thread runout 22. At the lower end of sensor element 14 a cover 18 is accommodated, designed as a front plate, which has a finger-shaped projection 20 for accommodating a temperature sensor. The pressure measuring part of combined pressure and temperature sensor 10 is shown by a through-hole 24 that passes through sensor element 14 and is not shown in FIG. 1 (cf. FIG. 1.1), which acts upon a diaphragm 64. Diaphragm 64 is preferably developed as a steel diaphragm to which a metallic thin-layer bridge circuit is applied, which measures the stretching of diaphragm 64 based on the pressure in through-hole 24.

FIG. 1.1 shows the sensor element of the combined pressure and temperature sensor according to FIG. 1 from its lower side having a cover, designed as a front plate, shown in section.

Below screw thread runout 22 of threaded section 16 on sensor element 14, there is an annular contact surface 26. Contact surface 26 simplifies the mounting of cover 18, that is designed as a front plate, on the lower side of sensor element 14, and centers this, already during its application to contact surface 26. Cover 18, designed as a front plate, includes an opening 34 which is aligned with bore 24, that was mentioned in connection with FIG. 1, for the pressure measurement. Temperature sensor 28, that runs in sensor element 14, has a head 32, that ends in a hollow space 36 of finger-shaped projection 20 of cover 18 that is designed as a front plate. Temperature sensor 28 is preferably surrounded by a plastic extrusion coating 30, which is used for the insulation of the contacts of temperature sensor 28 as well as the adjustment and a guidance during the mounting process of temperature sensor 28 in sensor element 14. The wall strength of component 18 in the area of finger-shaped projection 20 is also equivalent to the remaining wall strength of cover 18 that is designed as a front plate. Component 18 is preferably manufactured as a deep-drawn component, in which, in one operation, a collar as well as finger-shaped projection 20 can be produced.

FIG. 2 shows the sensor element of the combined pressure and temperature sensor in section.

It will be seen in the illustration according to FIG. 2 that, in sensor element 14 of combined pressure and temperature sensor 10, on the one hand, through-hole 24 for recording the pressure of the flowing medium is developed, and on the other hand, a bore 42 is developed that runs parallel to it, into which temperature sensor 28 is inserted. The length of temperature sensor 28 is denoted by reference numeral 44. Temperature sensor 28 has head 32 at the medium end, and at the other end it has contacts 48, via which the recorded temperature can be read off. Temperature sensor 28 is surrounded by plastic extrusion coating 30 over essentially its entire length, except for head 32. Inserting temperature sensor 28 into bore 42 is made easier by plastic extrusion coating 30. This simplifies the assembly greatly, and it avoids damage to temperature sensor 28 during its mounting in sensor element 14. Temperature sensor 28 is preferably designed as an NTC element, but can also be represented by a thermocouple or a platinum resistor. It is assured by plastic extrusion coating 30 that contacts 48 of temperature sensor 28 remain insulated from each other, and are introduced accurately into bore 42 for temperature sensor 28. During manufacturing, temperature sensor 28 is able to be inserted without a problem and without further adjustment measures or process steps into bore 42, because of the chosen design approach.

At sensor element 14 of combined pressure and temperature sensor 10, on the outer side, there is threaded section 16 that was mentioned before, which ends in a screw thread runout 22. In addition, sensor element 14 has a conical sealing seat 46, which assures sealing of sensor element 14 from the medium flowing against its end face. The conical sealing seat lies behind the temperature measuring location, that is, head 32 of temperature sensor 28. This offers the possibility that sensor element 14 is washed over in an optimally advantageous manner by the medium whose pressure and temperature are to be measured. Conical seal 46 additionally offers the advantage, compared to a conventional O-ring, that it forms a substantially bigger sealing surface, and the sealing force is able to be set to an exact measure, by the tightening torque exerted on tool connection 12.

In a perspective illustration, FIG. 3 shows the medium end of the sensor element.

Previously mentioned threaded section 16 runs out in a screw thread runout 22. At one end face 40 of sensor element 14, contact surface 26 is developed for cover 18 that is designed as a front plate (cf. FIG. 3.1). In the illustration according to FIG. 3, temperature sensor 28, that is surrounded by plastic extrusion coating 30, is inserted into bore 42 in sensor element 14. Only head 32 of temperature sensor 28 extends from plastic extrusion coating 30. Through-hole 24, that runs in sensor element 14, is also to be seen in FIG. 3.

In a sectional representation, FIG. 3.1 shows the cover, designed as a front plate, having the finger-shaped projection, into which a heat-conducting sealing compound has been inserted.

If cover 18, that is designed as a front plate, which is shown in section in FIG. 3.1, is mounted on contact surface 26 of sensor element 14, according to FIG. 3, head 32 of temperature sensor 28 dips into heat-conducting sealing compound 50 that was introduced before into finger-shaped projection 20. The inside of hollow space 36 is designated by reference numeral 52.

One may also infer from the illustration according to FIG. 3.1 that cover 18, that is designed as a front plate, has an opening 34, which is aligned with through-hole 24 in sensor element 14, according to FIG. 3. In addition, a collar 54 is developed on cover 18 that is designed as a front plate. On its inside 56, collar 54 is fitted to contact surface 26 in the vicinity of the end face of sensor element 14, for instance, using a thermal joining method, such as laser welding. When joining cover 18, that is designed as a front plate according to FIG. 3.1, to sensor element 14, head 32 of temperature sensor 28 dips into hollow space 36 of finger-shaped projection 20 of cover 18 that is designed as a front plate. Finger-shaped projection 20, which is formed on cover 18 that is designed as a front plate, may be executed in different lengths, in order to achieve various dipping depths of temperature sensor 28 into the medium. For the improvement of the temperature coupling, using heat-conducting compound 50, such as, for instance, silicone adhesive, an optimum heat transfer from finger-shaped projection 20 is achieved via its wall 38 and the[FOOT: , die should be und die] heat-conducting sealing compound to head 32 of temperature sensor 28. Because of the front addition position, the variable dipping depth that depends on the length at which finger-shaped projection 20 is developed on cover 18, and the closeness to the measured medium, a very accurate and rapid temperature measurement is assured.

FIG. 4 shows the cover designed as a front plate in a state in which it is joined to the sensor element.

According to the illustration in FIG. 4, cover 18, which is designed as a front plate, is centered with its collar 54 on contact surface 26, at the lower side of sensor element 14. Self-centering takes place even when cover 18, which is designed as a front plate, is pushed onto contact surface 26 at the lower side of sensor element 14. This assures that opening 34 of cover 18, which is designed as a front plate, is aligned with pressure bore 24 in sensor element 14 (cf. illustration according to FIG. 3). In order to produce a seal between cover 18, which is designed as a front plate, and contact surface 26 of sensor element 14, a thermal joining method is preferably used. A first circumferential joining location 60 is produced between contact surface 26 and the inside 56 of collar 54. In addition, a second sealing location is produced by a second joining location 62, which extends in a circular manner around opening 34 at the end face of sensor element 14. Consequently, the temperature measurement of the medium, into which finger-shaped projection 20 dips, is independent of the pressure measurement that takes place via opening 34 and through-hole 24, using combined pressure and temperature sensor 10 provided.

In addition, it may be seen in FIG. 4 that hollow space 36 of finger-shaped projection 20, into which head 32 of temperature sensor 28 dips, is able to be filled with heat-conducting sealing compound 50 within a filling range 58. Depending on the application, hollow space 36 is able to be provided over the entire filling range 58 with heat-conducting sealing compound 50, while it is also possible to fill only a part of hollow space 36, using a lesser quantity of heat-conducting sealing compound 50, as is shown in FIG. 3.1.

One may see in the illustration according to FIG. 5 a completely mounted combined pressure and temperature sensor.

It may be seen in the illustration according to FIG. 5 that cover 18, which is designed as a front plate, is joined to contact surface 26 of sensor element 14. Opening 34 made in cover 18, which is designed as a front plate, is aligned with through-hole 24 of sensor element 14, at whose outside is threaded section 16, which runs out into screw thread runout 22. Between collar 54 of cover 18, which is designed as a front plate, and contact surface 26 of the sensor element, first thermal joining location 60 takes its course; second thermal joining location 62 runs around opening 34, so that finger-shaped projection 20 is sealed from the pressure.

Temperature sensor 28, be it an NTC element, be it a thermocouple or a platinum resistor, extends within bore 42 of sensor element 14, and is adjusted in it by plastic extrusion coating 30. Head 32 of temperature sensor 28 extends into hollow space 36 of finger-shaped projection 20, while contacts 48 are guided through tool connection 12 (for instance, a hexagonal one) and are contacted above it.

Through-hole 24 of the pressure measuring part of sensor element 14 is bordered by a diaphragm 64. The lower side 66 of diaphragm 64 has the pressure applied to it, and accordingly the upper side 38 of the diaphragm, which is preferably a steel diaphragm, is deformed. The diaphragm that is preferably made as a steel diaphragm converts the pressure into a force that is transmitted via a push rod 70. Push rod 70, in turn, presses against a silicon chip 72 that is accommodated in a chip carrier 74. Silicon chip 72 includes, for instance, silicon piezo-resistors, and into these an evaluating circuit may also be integrated at the same time. The signals are able to be picked off at contacts 76 on the upper side of chip carrier 74, and be processed further in a control unit, for example, for vehicle air conditioning.

What is claimed is:

1. A combined pressure and temperature sensor, comprising:
    a diaphragm;
    a sensor element that includes a through-hole to the diaphragm and a bore to accommodate a temperature sensor, the diaphragm cooperating with a pressure sensor; and
    a cover fastened at an end face on the side of a medium of the sensor element, in which a hollow space is developed to accommodate the temperature sensor;
    wherein the cover is manufactured as a deep-drawn part in which a peripheral collar and a finger-shaped projection are formed; and
    wherein the sensor element has a conical sealing seat which, as seen in the effective direction of the medium, is located behind the finger-shaped projection of the cover.

2. The combined pressure and temperature sensor as recited in claim 1, wherein the cover is joined to a contact surface of the sensor element at a joining location having a first continuous material connection.

3. The combined pressure and temperature sensor as recited in claim 1, wherein the cover includes an opening, which is aligned with the through-hole of the sensor element.

4. The combined pressure and temperature sensor as recited in claim 3, wherein the first continuous material connection runs at the collar of the cover and the second continuous material connection of the cover to the sensor element lies around an opening in the cover.

5. The combined pressure and temperature sensor as recited in claim 1, wherein the temperature sensor is embedded in a heat-conducting sealing compound that is inserted into the hollow space.

6. The combined pressure and temperature sensor as recited in claim 5, wherein the heat-conducting sealing compound is one of a silicone adhesive, a silver conducting adhesive, and a heat-conducting paste.

7. The combined pressure and temperature sensor as recited in claim 1, wherein the temperature sensor is provided with a plastic extrusion coating which extends over the length or over a part of the length of the temperature sensor.

8. The combined pressure and temperature sensor as recited in claim 1, wherein the temperature sensor is designed as one of an NTC element, a thermocouple, and a platinum resistor.

* * * * *